United States Patent
Piegert et al.

(10) Patent No.: US 8,763,885 B2
(45) Date of Patent: Jul. 1, 2014

(54) COBALT-BASED ALLOY COMPRISING GERMANIUM AND METHOD FOR SOLDERING

(75) Inventors: Sebastian Piegert, Berlin (DE); Peter Randelzhofer, Erlangen (DE); Robert Singer, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/978,727

(22) PCT Filed: Dec. 6, 2011

(86) PCT No.: PCT/EP2011/071846
§ 371 (c)(1),
(2), (4) Date: Jul. 30, 2013

(87) PCT Pub. No.: WO2012/095221
PCT Pub. Date: Jul. 19, 2012

(65) Prior Publication Data
US 2013/0299562 A1 Nov. 14, 2013

(30) Foreign Application Priority Data
Jan. 14, 2011 (EP) .................................... 11150953

(51) Int. Cl.
*B23K 31/02* (2006.01)
*C22C 19/07* (2006.01)

(52) U.S. Cl.
USPC .................. 228/233.2; 420/436; 420/439

(58) Field of Classification Search
None
See application file for complete search history.

(56) References Cited

U.S. PATENT DOCUMENTS

| | | | | |
|---|---|---|---|---|
| 4,299,622 A | * | 11/1981 | Kimira et al. | 420/77 |
| 4,874,577 A | * | 10/1989 | Wakita et al. | 420/417 |
| 5,849,113 A | * | 12/1998 | Murakami et al. | 148/430 |
| 6,024,794 A | | 2/2000 | Nagai | |
| 6,924,046 B2 | * | 8/2005 | Stamm | 428/678 |
| 7,156,280 B1 | * | 1/2007 | Jiang et al. | 228/56.3 |
| 2003/0049154 A1 | * | 3/2003 | Xu et al. | 420/417 |
| 2006/0249231 A1 | * | 11/2006 | Bezerra et al. | 148/425 |
| 2007/0017958 A1 | * | 1/2007 | Hasz et al. | 228/101 |
| 2008/0029500 A1 | * | 2/2008 | Malley et al. | 219/121.85 |
| 2009/0041611 A1 | * | 2/2009 | Sathian et al. | 419/29 |

(Continued)

FOREIGN PATENT DOCUMENTS

EM 1319729 A1 6/2003
EP 0486489 B1 11/1994

(Continued)

OTHER PUBLICATIONS

Cobalt-Germanium 1-15 In: Massalski: Binary Alloy Phase Oiagrams; Elliot: "Cobalt-Germanium" 1-15 In: Massalski: "Binary Alloy Phase Oiagrams", Jan. 1, 1986 (Jan. 1, 1986), ASM, American Society for Metals, USA, XP002637049, ISBN: 0871702614 Bd. 1, Seite 768, * Seite 768 *; 1986; US; Jan. 1, 1986.

(Continued)

*Primary Examiner* — Kiley Stoner

(57) ABSTRACT

Cobalt-based solder alloys are proposed. The cobalt-based solder alloys have germanium. The germanium has a higher melting point than nickel-based alloys such that the germanium is used advantageously for repairing or treating components having the nickel-based alloys used at high temperatures. The components are repaired or treated by soldering using the cobalt-based solder alloys.

6 Claims, 3 Drawing Sheets

(56) References Cited

U.S. PATENT DOCUMENTS

| | | | |
|---|---|---|---|
| 2010/0025454 A1* | 2/2010 | Heinz et al. | 228/119 |
| 2013/0028783 A1* | 1/2013 | Ott et al. | 420/445 |
| 2013/0045129 A1* | 2/2013 | Ott et al. | 420/450 |

FOREIGN PATENT DOCUMENTS

| | | | |
|---|---|---|---|
| EP | 0412397 | B1 | 3/1998 |
| EP | 0892090 | A1 | 1/1999 |
| EP | 0786017 | B1 | 3/1999 |
| EP | 1306454 | A1 | 5/2003 |
| EP | 1204776 | B1 | 6/2004 |
| GB | 2163778 | A * | 3/1986 |
| JP | 56-130449 | A * | 10/1981 |
| JP | 58-034156 | A * | 2/1983 |
| JP | 62-008503 | A * | 1/1987 |
| JP | 63-241142 | A * | 10/1988 |
| WO | WO 9967435 | | 12/1999 |
| WO | WO 0044949 | A1 | 8/2000 |
| WO | WO 2008089752 | A1 | 7/2008 |
| WO | WO 2008110454 | A1 | 9/2008 |

OTHER PUBLICATIONS

"Germanium-Nickel" 1-15 In: Massalski: "Binary Alloy Phase Oiagrams-"; Nash: "Germanium-Nickel" 1-15 In: Massalski: "Binary Alloy Phase Oiagrams-", Jan. 1, 1986 (Jan. 1, 1986), ASM, American Society for Metals, Ohio US, XP002637050, ISBN: 0871702614 Bd. 2, Seiten 1230-1231, * Seite 1230-Seite 1231 *; 1986; US; Jan. 1, 1986.

* cited by examiner

FIG 3

| Werkstoff | C | Cr | Ni | Co | Mo | W | Ta | Nb | Al | Ti | B | Zr | Hf |
|---|---|---|---|---|---|---|---|---|---|---|---|---|---|
| Ni-Basis-Feingußlegierungen | | | | | | | | | | | | | |
| GTD 222 | 0.10 | 22.5 | Rest | 19.0 | | 2.0 | 1.0 | | 1.2 | 2.3 | 0.008 | | |
| IN 939 | 0.15 | 22.4 | Rest | 19.0 | | 2.0 | 1.4 | 1.0 | 1.9 | 3.7 | 0.009 | 0.10 | |
| IN 6203 DS | 0.15 | 22.0 | Rest | 19.0 | | 2.0 | 1.1 | 0.8 | 2.3 | 3.5 | 0.010 | 0.10 | 0.75 |
| Udimet 500 | 0.10 | 18.0 | Rest | 18.5 | 4.0 | | | | 2.9 | 2.9 | 0.006 | 0.05 | |
| IN 738 LC | 0.10 | 16.0 | Rest | 8.5 | 1.7 | 2.6 | 1.7 | 0.9 | 3.4 | 3.4 | 0.010 | 0.10 | |
| SC 16 | <0.01 | 16.0 | Rest | | 3.0 | | 3.5 | | 3.5 | 3.5 | <0.005 | <0.008 | |
| Rene 80 | 0.17 | 14.0 | Rest | 9.5 | 4.0 | 4.0 | | | 3.0 | 5.0 | 0.015 | 0.03 | |
| GTD 111 | 0.10 | 14.0 | Rest | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rest | 9.0 | 1.9 | 4.1 | 4.1 | | 3.4 | 3.8 | 0.015 | 0.02 | 1.00 |
| IN 792 DS | 0.08 | 12.5 | Rest | 9.0 | 1.9 | 4.1 | 4.1 | | 3.4 | 3.8 | 0.015 | 0.02 | 1.50 |
| MAR M 002 | 0.15 | 9.0 | Rest | 10.0 | | 10.0 | 2.5 | | 5.5 | 1.5 | 0.015 | 0.05 | 1.40 |
| MAR M 247 LC DS | 0.07 | 8.1 | Rest | 9.2 | 0.5 | 9.5 | 3.2 | | 5.6 | 0.7 | 0.015 | 0.02 | |
| CMSX-2 | <.006 | 8.0 | Rest | 4.6 | 0.6 | 8.0 | 6.0 | | 5.6 | 1.0 | <.003 | <.0075 | 0.10 |
| CMSX-3 | <.006 | 8.0 | Rest | 4.6 | 0.6 | 8.0 | 6.0 | | 5.6 | 1.0 | <.003 | <.0075 | 0.10 |
| CMSX-4 | | 6.0 | Rest | 10.0 | 0.6 | 6.0 | 6.0 | | 5.6 | 1.0 | | Re=3.0 | |
| CMSX-6 | <.015 | 10.0 | Rest | 5.0 | 3.0 | <.10 | 2.0 | <.10 | 4.9 | 4.8 | <.003 | <.0075 | 0.10 |
| PWA 1480 SX | <.006 | 10.0 | Rest | 5.0 | | 4.0 | 12.0 | | 5.0 | 1.5 | <.0075 | <.0075 | |
| PWA 1483 SX | 0.07 | 12.2 | Rest | 9.0 | 1.9 | 3.8 | 5.0 | | 3.6 | 4.2 | 0.0001 | 0.002 | |
| Co-Basis-Feingußlegierungen | | | | | | | | | | | | | |
| FSX 414 | 0.25 | 29.0 | 10 | Rest | | 7.5 | | | | | 0.010 | | |
| X 45 | 0.25 | 25.0 | 10 | Rest | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rest | | 7.5 | 4 | | | 0.3 | 0.010 | 0.60 | |
| CM 247 | 0.07 | 8.3 | Rest | 10.0 | 0.5 | 9.5 | 3.2 | | 5.5 | 0.7 | | | 1.5 | chemische Zusammensetzung in %

COBALT-BASED ALLOY COMPRISING GERMANIUM AND METHOD FOR SOLDERING

CROSS REFERENCE TO RELATED APPLICATIONS

This application is the US National Stage of International Application No. PCT/EP2011/071846 filed Dec. 6, 2011 and claims benefit thereof, the entire content of which is hereby incorporated herein by reference. The International Application claims priority to the European application No. 11150953.5 EP filed Jan. 14, 2011, the entire contents of which is hereby incorporated herein by reference.

BACKGROUND OF INVENTION

Solder alloys are used for joining and repairing components.

Nickel-based superalloys are often used in the case of components for turbines, e.g. gas turbines for generating electricity or for aircraft and also other turbines.

Accordingly, nickel-based solders are developed in order to repair these materials. Germanium-containing nickel-based alloys are similarly known.

It is often the case, however, that the desired high soldering temperatures are not reached; these make it possible to use components in high-temperature use in turn at high temperatures, because otherwise the low strength in the region of the solder puts the component at risk.

SUMMARY OF INVENTION

It is an object of the invention, therefore, to specify a solder alloy which solves the aforementioned problem.

The object is achieved by a solder alloy and by a method as claimed in the independent claims.

The dependent claims list further advantageous measures which can be combined with one another, as desired, in order to achieve further advantages.

BRIEF DESCRIPTION OF DRAWINGS

FIG. 3 shows a list of superalloys.

DETAILED DESCRIPTION OF INVENTION

Figure 1:
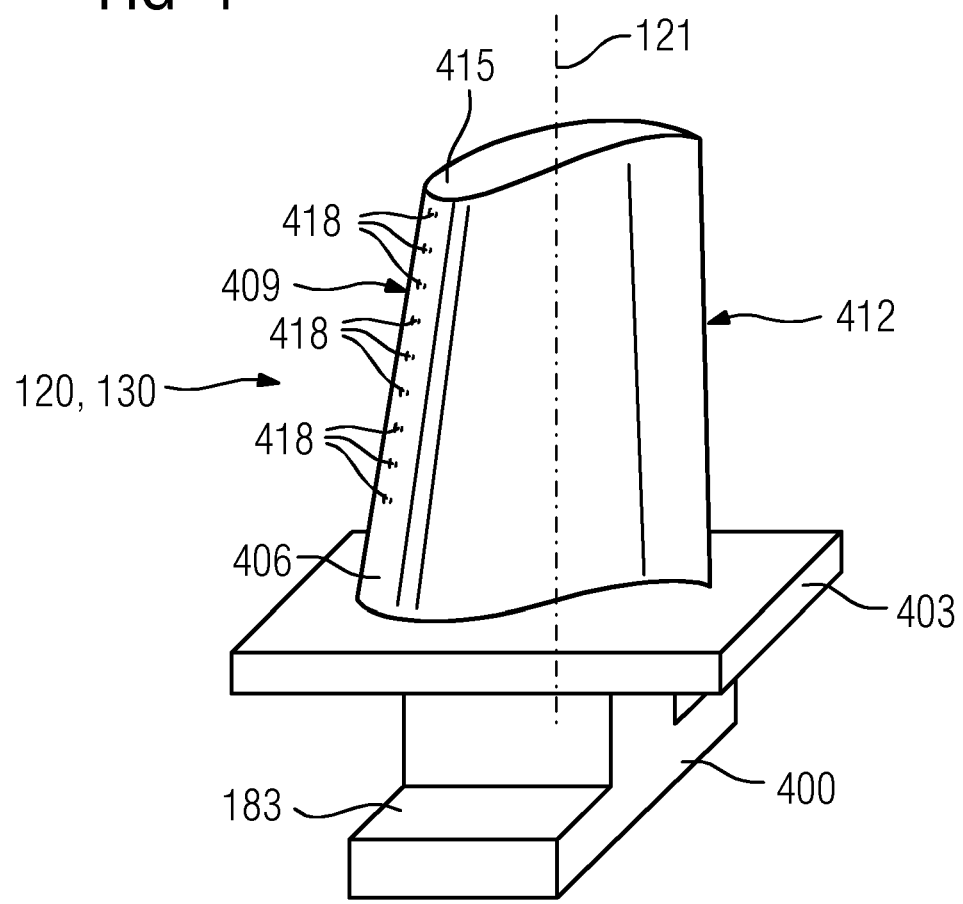
FIG. 1 shows a turbine blade or vane.

The description represents only exemplary embodiments of the invention.

What is specified according to the invention is a cobalt-based alloy comprising germanium. The proportion of germanium is between 13% by weight and 27% by weight, in particular between 14% by weight and 26% by weight. The base is formed here by cobalt having proportions of 40% by weight to 47% by weight.

Furthermore, the cobalt-based alloy comprises:
7.0% by weight to 9.0% by weight nickel (Ni),
17.0% by weight to 21.0% by weight chromium (Cr),
5.0% by weight to 6.5% by weight tungsten (W),
2.0% by weight to 4.0% by weight tantalum (Ta),
0.1% by weight to 0.3% by weight titanium (Ti),
13.0% by weight to 27.0% by weight germanium (Ge), and
optionally 0.3% by weight to 0.7% by weight zirconium (Zr),
optionally 0.3% by weight to 0.7% by weight carbon (C).

Although the list of the alloying elements is preferably conclusive, further elements (gallium (Ga) and/or silicon (Si)) can be present for increasing strength, influencing phases or influencing the melting point.

Effects of the Elements:

Chromium (Cr)
- higher corrosion resistance resulting from chromium, the resistance ought to be considerably higher particularly compared to boron-containing solders, since no chromium is bound in borides and is therefore available effectively for passivation,
- the Cr content is adapted to the base materials, which ought to have a positive effect on the homogeneity of the solder composite.

Titanium (Ti):
- on the one hand, it reduces the melting point of the solder alloy, i.e. is therefore a secondary melting-point reducer alongside germanium/gallium/silicon,
- on the other hand, the solder is again adapted to the base material with the Ti contents mentioned,
- in addition, titanium is a carbide-forming element and thus hardens the base material and also the solder alloy,
- in addition, the addition of titanium is not considered in most solder alloys, since titanium is fairly active and, in certain circumstances, passivation of the solder particles by oxidation may occur.

Germanium (Ge):
In the soldered joints, the Ge content leads to drastically reduced proportions of low-melting eutectics. Furthermore, it has been found that germanium, as a melting-point-reducing element, does not lead to incompatibilities between soldered regions and metallic adhesion promoter layers, in particular comprising MCrAlY.

Germanium can be replaced by similar elements, in particular such as gallium (Ga) and/or silicon (Si).

Silicon then preferably has a proportion of at least 0.3% by weight and/or gallium then preferably has a proportion of at least 1.0% by weight.

Cobalt-based alloys prove to be particularly advantageous, since the primary melting-point reducer (Ge) here has a high solubility, which keeps the diffusion times during the heat treatment within limits.

Co-based alloys, such as X 40, X 45 FSX-41, MAR-M 509 and ELY 768, can advantageously be joined or soldered with the described solder. Co-based alloys advantageously have a high soldering temperature, and therefore it is possible to achieve a considerable reduction in the proportion of the primary melting-point reducer, which greatly reduces the formation of low-melting eutectics in the solder gap. The similarity between the solder alloy and the base material is additionally advantageous, with the result that the addition of additive powder similar to the base material is no longer necessary and furthermore that the decomposition of powder mixtures from solder and additive, as commonly occurs particularly in narrow gap welding, no longer takes place, so as to give rise to a homogeneous concentration of the elements in the join, which benefits the mechanical properties.

Germanium (Ge) can be replaced partially or completely by gallium (Ga) and/or silicon (Si), i.e. the following mixtures are possible in the alloy:

Co—Ni—Cr—W—Ta—Ti+Ge
Co—Ni—Cr—W—Ta—Ti+Ge+Si
Co—Ni—Cr—W—Ta—Ti+Ge+Ga
Co—Ni—Cr—W—Ta—Ti+Ge+Ga+Si
Co—Ni—Cr—W—Ta—Ti+Ga+Si
Co—Ni—Cr—W—Ta—Ti+Ga, and the optional constituents carbon (C) and/or zirconium (Zr).

A nickel-based substrate, in particular as shown in FIG. 3, is then preferably soldered or processed with this cobalt-based alloy as the solder.

In this process, temperatures of between 1130° C. and 1270° C. are used with preference.

FIG. 1 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400. The blade or vane root 183 is designed, for example, in hammerhead form. Other configurations, such as a fir-tree or dovetail root, are possible. The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130. Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures). Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1. The density is preferably 95% of the theoretical density. A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX. The thermal barrier coating covers the entire MCrAlX layer.

Columnar grains are produced in the thermal barrier coating by suitable coating processes, such as for example electron beam physical vapor deposition (EB-PVD). Other coating processes are possible, for example atmospheric plasma spraying (APS), LPPS, VPS or CVD. The thermal barrier coating may include grains that are porous or have microcracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

Figure 2:
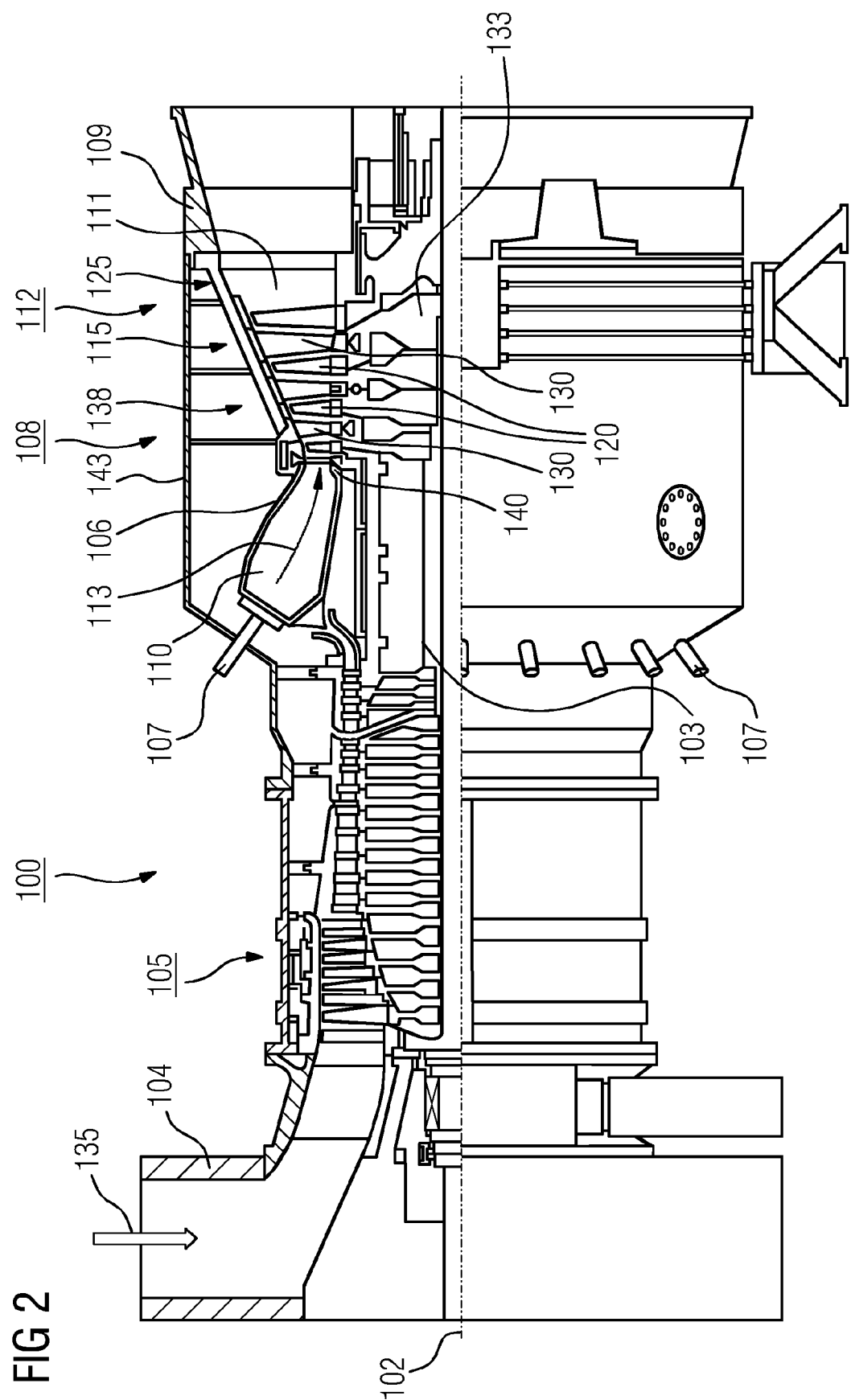
FIG. 2 shows a turbine.

FIG. 2 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110. Superalloys of this type are known, for example, from EP 1 204 776 B1, EP 1 306 454, EP 1 319 729 A1, WO 99/67435 or WO 00/44949.

The blades or vanes 120, 130 may likewise have coatings protecting against corrosion (MCrAlX; M is at least one element selected from the group consisting of iron (Fe), cobalt (Co), nickel (Ni), X is an active element and stands for yttrium (Y) and/or silicon, scandium (Sc) and/or at least one rare earth element, or hafnium). Alloys of this type are known from EP 0 486 489 B1, EP 0 786 017 B1, EP 0 412 397 B1 or EP 1 306 454 A1. It is also possible for a thermal barrier coating to be present on the MCrAlX, consisting for example of $ZrO_2, Y_2O_3$—$ZrO_2$, i.e. unstabilized, partially stabilized or fully stabilized by yttrium oxide and/or calcium oxide and/or magnesium oxide. Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

The invention claimed is:

1. A cobalt-based solder alloy, consisting of (in % by weight):
   7.0% to 9.0% nickel,
   17% to 21% chromium,
   5.0% to 6.5% tungsten,
   2.0% to 4.0% tantalum,
   0.1% to 0.3% titanium,
   13% to 27% germanium,
   0.3% to 0.7% carbon, and
   0.2% to 0.7% zirconium.

2. The solder alloy as claimed in claim 1, consisting of:
   7.5% to 8.5% nickel,
   18.0% to 20.5% chromium,
   5.1% to 6.1% tungsten,
   2.5% to 3.2% tantalum,
   0.2% titanium,
   14% to 26% germanium,
   0.4% to 0.6% carbon, and
   0.3% to 0.6% zirconium.

3. The solder alloy as claimed in claim 2, wherein the solder alloy further consists of 18% to 22% germanium.

4. A method for repairing a nickel-based substrate, comprising:
   soldering the substrate using a cobalt-based solder alloy as claimed in claim 1.

5. The method as claimed in claim 4, wherein the soldering is carried out at between 1130° C. and 1270° C.

6. The method as claimed in claim 4, wherein the solder alloy is used without a further admixture.

* * * * *